(12) United States Patent
Fernandez et al.

(10) Patent No.: US 10,353,412 B2
(45) Date of Patent: Jul. 16, 2019

(54) POWER HARVESTING CIRCUIT EMPLOYING SATURABLE CORE TRANSFORMER

(71) Applicant: PulseIQ, LLC, Berlin, MD (US)

(72) Inventors: Emilio A. Fernandez, McClean, VA (US); Angel P. Bezos, Hollywood, FL (US)

(73) Assignee: PulseIQ, LLC, Berlin, MD (US)

( * ) Notice: Subject to any disclaimer, the term of this patent is extended or adjusted under 35 U.S.C. 154(b) by 0 days.

(21) Appl. No.: 16/034,459

(22) Filed: Jul. 13, 2018

(65) Prior Publication Data

US 2019/0011940 A1 Jan. 10, 2019

Related U.S. Application Data

(63) Continuation-in-part of application No. 15/609,272, filed on May 31, 2017, now Pat. No. 10,048,708.
(60) Provisional application No. 62/344,493, filed on Jun. 2, 2016.

(51) Int. Cl.
| | |
|---|---|
| *G05D 23/24* | (2006.01) |
| *H02P 27/04* | (2016.01) |
| *H02H 1/00* | (2006.01) |
| *H02H 7/055* | (2006.01) |
| *H02M 7/06* | (2006.01) |

(52) U.S. Cl.
CPC ....... *G05D 23/2451* (2013.01); *H02H 1/0007* (2013.01); *H02H 1/0061* (2013.01); *H02H 7/055* (2013.01); *H02P 27/04* (2013.01); *H02M 7/06* (2013.01)

(58) Field of Classification Search
CPC ............ G05D 23/2451; H02H 1/0007; H02H 1/0061; H02H 7/055; H02P 27/04; H02M 7/06
See application file for complete search history.

(56) References Cited

U.S. PATENT DOCUMENTS

| | | | |
|---|---|---|---|
| 6,969,927 B1 * | 11/2005 | Lee ........................... | H02J 3/14 307/17 |
| 8,866,345 B1 * | 10/2014 | Wright ................... | H02H 1/043 307/99 |
| 2010/0039090 A1 * | 2/2010 | Sykes ...................... | H02M 5/12 323/301 |

* cited by examiner

*Primary Examiner* — Emily P Pham
(74) *Attorney, Agent, or Firm* — W&C IP

(57) ABSTRACT

A power harvesting system employs a saturable core transformer having first and second primary windings and a secondary winding. The first primary winding is a high impedance winding with a large number of turns and the second primary winding is a low impedance winding with a small number of turns. The first and second primary windings are connected to a load. A relay is operable in a first state to connect A/C power to the first primary winding and in a second state to connect A/C power to the second primary winding. When A/C power is connected to the first primary winding, a small current flows in the first primary winding which is insufficient to activate the load but sufficient to transfer power to the secondary winding. When A/C power is connected to the second primary winding, a larger current flows in the second primary winding sufficient to activate the load and to transfer power to the secondary winding.

10 Claims, 11 Drawing Sheets

POWER HARVESTING CIRCUIT EMPLOYING SATURABLE CORE TRANSFORMER

CROSS REFERENCE TO RELATED APPLICATIONS

Applicants claim benefit of Provisional Patent Application Ser. No. 62/344,493 filed Jun. 2, 2016, by Emilio A. Fernandez and Angel P. Bezos for "Power Harvesting Circuit". This application is a continuation-in-part of application Ser. No. 15/609,272 filed May 31, 2017, by Emilio A. Fernandez and Angel P. Bezos for "Power Harvesting Circuit".

BACKGROUND OF THE INVENTION

Field of the Invention

The present invention generally relates to a power harvesting circuit and, more particularly, to a power harvesting circuit which provides power to electronic components in an electronic thermostat replacement for mechanical or mercury bulb type thermostats.

Background Description

Prior art mechanical or mercury bulb type thermostats are used in many apartment buildings, houses and industrial installations. These devices do not use any electrical power to operate and perform their temperature control function by mechanical means using temperature sensitive mechanical devices that move in order to close an electrical contact, which usually drives directly a load such as a fan motor or other similar HVAC device or a relay that then drives such devices. When these mechanical type thermostats are replaced by modern electronic thermostats, there is a problem of how to power the electronic thermostat. The choices have come down to running an extra wire, which is usually prohibitively expensive, or devise other means, such as batteries with which to power the electronic thermostat.

Examples of prior art efforts to solve the problem of providing power to replacement thermostats include U.S. Pat. No. 4,177,923 to Krump which discloses a battery operated thermostat timer with battery charging circuits. Krump uses a transformer with a winding in series with the load to provide charge to the battery and a diode and resistor combination to provide charge to the battery when the thermostat circuit is open. Since the load is very large in comparison with the power taken in either contact open or contact closed position, then the small amount of power to keep the battery charged is said to be "stolen" or "harvested" from the usual power that is delivered to the load.

Another timer/battery charging system similar but more sophisticated than described by Krump is disclosed by U.S. Pat. No. 4,249,696 to Donnelly et al. This circuit relies on a Triac and an accompanying controlled solid state and gating means.

U.S. Pat. No. 4,333,605 to Peters describes a high impedance/low impedance power supply for a temperature control system. According to Peters, the temperature is controlled by turning on or off an electromagnetic relay which then turns on or off a motor or another relatively high power load (compared to the relay), such as a resistance heater. The electromagnetic relay provides the power supply with a constant load with known characteristics and with relatively lower power demand when compared with the load driven by the relay contacts.

SUMMARY OF THE INVENTION

It is therefore an object of the present invention to provide a simple and relatively inexpensive power harvesting circuit for powering a replacement electronic thermostat.

It is another object of the invention to provide a power harvesting circuit for powering an electronic thermostat which is designed to power a large, low impedance high current load, such as a ¼HP or ½ HP, 115 VAC motor directly with minimum power dissipation in the harvesting circuit.

Minimizing power dissipation is critical since the space available for the power harvesting circuit and the electronic thermostat that it powers is very small, ideally the inside of a standard electrical junction box, and the power dissipation can have an effect and corrupt thermostat readings. This is so important that Johnstone et al. in U.S. Pat. No. 4,776,514 use a thermistor to monitor the temperature increase due to power dissipation and uses this information to compensate the thermostat readings. Of course, using a thermistor increases complexity and adversely affects costs.

It is another object of the invention to handle variable loads such as ⅛HP to ½HP 115 VAC motors that might be installed in the HVAC system.

Being able to handle varying loads is a significant advantage as a larger number of installations can be handled by the same device and also because, due to maintenance and other factors, the load can change during the life of the product. The ability to work with variable loads is important if not critical when retrofitting existing systems with new electronic thermostats as the size of the motor (load) can vary and is often not known in advance. Also due to the fact that motors have a finite life and are routinely changed, sometimes with a motor that presents a different load to the system.

Also, the commercial realities are that this type of thermostat has to be inexpensive and very reliable and maintenance free as maintenance calls are very expensive both in terms of dollars and in terms of customer inconvenience or dissatisfaction if the thermostat is used in a habitable space such as an apartment.

According to an embodiment of the invention, there is provided a saturable core transformer having two primary windings and a secondary winding. One of the primary windings is a high impedance winding, and the other primary winding is a low impedance winding. The two primary windings are connected with the load (motor). The secondary winding provides power to the circuit components of the electronic thermostat. Relay contacts connect A/C power to the high impedance primary winding in a first state or to the low impedance primary winding in a second state. When the relay is de-energized, A/C power is applied to the high impedance winding so that a relatively small amount of current flows through the high impedance winding. This current is low enough that it does not energize the motor and in fact is invisible to the motor and does not affect motor operation at all but is sufficient to generate the required voltage to transfer power to the secondary winding to power the electronic thermostat. When the relay is energized, A/C power is applied directly to the low impedance primary winding, a larger current flows in the low impedance primary winding energizing the motor. As the current through the low impedance winding builds up, the core saturates.

The result is that a relatively short pulse is generated in the secondary on both the positive and negative A/C cycle. This pulse has an amplitude determined by the turns ratio of the low impedance winding to the secondary winding and is used to power the electronic thermostat. After the core saturates, the impedance of the low impedance winding is only the resistance of the wire of the winding which is very small and results in negligible impact on the motor operation and also results in relatively low power dissipation compared to the load.

In a first embodiment of the invention, the first and second primary windings are connected in series with the load so that when the relay connects A/C power to the first contact, current flows through both the first and second primary windings of the transformer, and when the relay connects A/C power to the second contact, current flows only in the second primary winding. In a second embodiment of the invention, the first and second primary windings are separately confected with the load so that when the relay connects A/C power to the first contact, current flows through only the first primary winding of the transformer, and when the relay connects A/C power to the second contact, current flows only in the second primary winding.

In a modification to the first and second embodiments, an approximation of the current flowing through the second primary winding of the transformer is sensed and this information is used to protect the circuit from a motor short. When the sensed current exceeds a predetermined threshold, the relay is actuated to remove the motor load.

According to a third embodiment of the invention, one or more switches can be controlled to selectively short a predetermined number of windings of the transformer second primary winding in response to the voltage output of the unregulated power supply exceeding one or more predetermined thresholds. The shorting of the second primary windings results in the output voltage of the power supply being decreased in proportion to the number of windings shorted. The fourth embodiment is a variation of the third embodiment, but instead of shorting only a portion of the second primary winding, the whole second primary winding is shorted when the voltage output of the unregulated power supply exceeds the predetermined threshold. After the voltage of the unregulated power supply reaches a predetermined value, the switch will turn off, unshorting the second primary winding. The advantage of this approach is that it does not require multiple taps or multiple solid state switches. The disadvantage is that it requires faster switching times of the solid state switches and faster microcontroller response, thus increasing cost and complexity. To achieve faster solid state switches, a DC/DC converter is used to power a different and faster type of solid state switch.

A fifth embodiment of the invention obtains power from the motor circuit without using the transformer. The power is taken directly from the same wire that feeds the transformer. The circuit obtains power when the motor is "on", which is the main challenge in obtaining power from the existing motor circuit. Obtaining power when the motor is "off" is relatively simple in comparison and can be accomplished via the transformer or an 115 VAC AC/DC converter as is done is telephone chargers. Thus, the fifth embodiment uses a "power off" harvesting circuit, such as one of the prior embodiments, as well as many other good, existing alternatives that can be used for this function.

According to the fifth embodiment, the circuit obtains power from the motor wire at the beginning of every cycle. As the cycle goes from negative to positive and crosses zero a current sensing transformer and zero crossing detector detects this event, and a one shot generates a pulse that sets a memory device such as a flip-flop. When the flip-flop is set, the output of the flip-flop controls the charging the capacitor to a predetermined level. When this level is reached, a signal is generated to set the flip-flop. The cycle is repeated again at the beginning of the next cycle.

The fifth embodiment can be modified to operate on either DC or AC input voltages by substituting low limit voltage comparator and high limit voltage comparator for the current sensing transformer and zero crossing detector. The voltage comparators monitor the voltage across the capacitor. The disadvantage of this modification when applied to an AC input is that the circuit will not be synchronized with the AC input, but this may not matter for certain applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
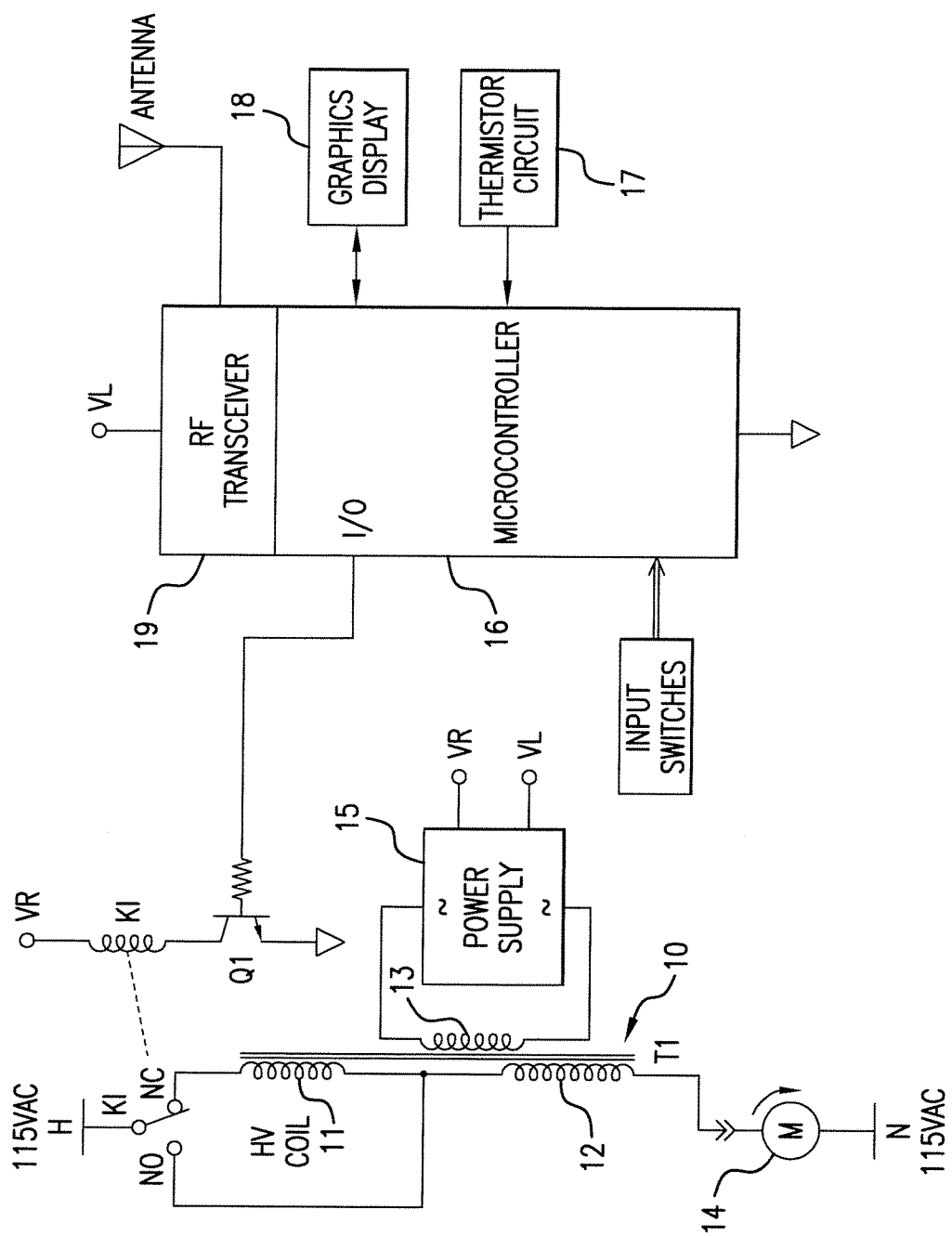
FIG. 1 is a schematic diagram of a first embodiment the power harvesting circuit according to the invention.

Referring now to the drawings, and more particularly to FIG. 1, there is shown a saturable core transformer 10 having two primary windings 11 and 12 and a single secondary winding 13. Primary winding 11 is a high impedance winding having, for example, 2500 turns, and primary winding 12 is a low impedance winding having, for example, twelve turns. The secondary winding 13 has, in this example, 256 turns The two primary windings are connected in series with the load (motor) 14. The secondary winding 13 provides power the power supply 15 which, in turn, powers circuit components of the electronic thermostat. The electronic thermostat typically includes a microcontroller 16 that receives an input from a Thermistor circuit 17 and controls relay contacts K1. Double throw relay contacts K1 connects A/C power to either the high impedance primary winding 11 or to the low impedance primary winding 12. Although an electro-mechanical relay is illustrated, those skilled in the art will recognize that the function of this relay can be performed by an equivalent solid-state drive. In some applications, the microcontroller 16 may communicate with a graphical display 18, which may be a touch screen display to provide user input. The microcontroller 16 may also communicate with an RF transceiver 19 to provide remote control or remote monitoring of important parameters such as set temperature and amount of time that the relay, and consequently the motor, are energized and de-energized. The transceiver 19 may be, for example, a WiFi or Bluetooth transceiver for local communication or a higher powered transceiver for distant communication.

When the relay K1 is de-energized, A/C power is applied to the high impedance winding 11 so that a relatively small amount of current, on the order of 10 to 15 mA, flows through both the high impedance winding 11 and the low impedance winding 12. This current is low enough that it does not energize the motor 14 and has negligible impact on the low voltage coil, but it is sufficient to generate the required voltage to transfer power to the secondary winding 13 and is used to power the electronic thermostat. When the relay K1 is energized, A/C power is applied directly to the low impedance primary winding, energizing the motor 14. At the beginning of each A/C cycle, the current through the low impedance winding builds up rapidly until the core of transformer 10 saturates. The result is that a relatively short pulse (about 2 milliseconds) is generated in the secondary winding 13 on both the positive and negative A/C cycle. This pulse has a current amplitude determined by the turns ratio of the low impedance winding to the secondary winding. This pulse is filtered and processed by the power supply 15 to power the electronic thermostat. After the core saturates, the impedance of the low impedance winding 12 is only the resistance of the wire of the winding which is very small. The voltage drop across primary winding 12 is very small, on the order of 1 to 2V peak and 0.7 to 1.4V RMS, which has a negligible impact on the motor operation.

Figure 2:
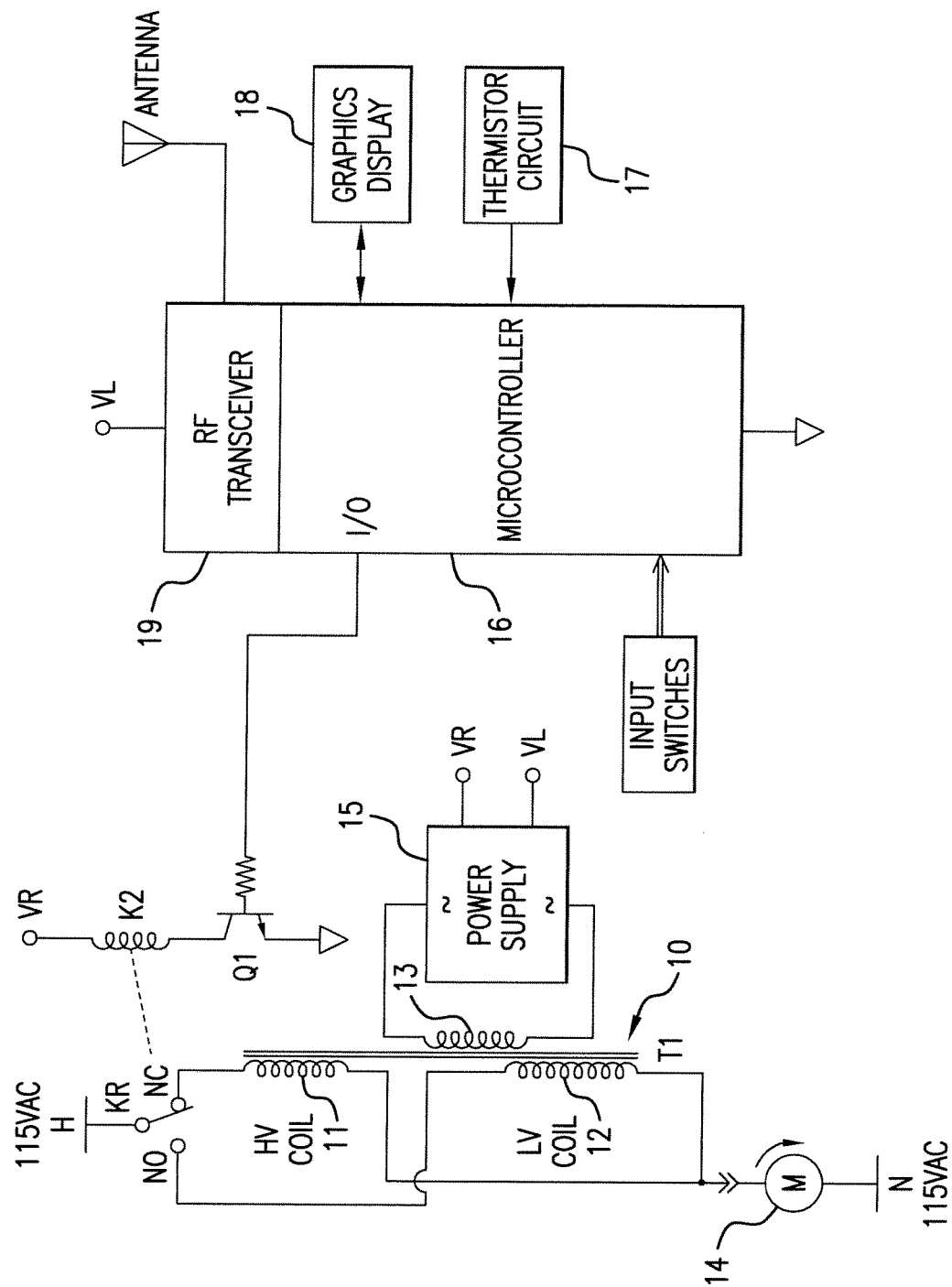
FIG. 2 is a schematic diagram of a second embodiment of the power harvesting circuit according to the invention.

FIG. 2 shows an alternate embodiment in which the two primary windings 11 and 12 are alternately connected to the A/C power with current flowing on only one or the other of the two primary windings. When the contacts of relay K2 are open, A/C current flows in only the high impedance winding 11. As a result, the current flowing through the high impedance winding is low enough that it does not energize the motor 14 but is sufficient to generate the required voltage to transfer power to the secondary winding 13 and is used to power the electronic thermostat as in the first embodiment. However, when the contacts of relay K2 are closed, A/C power is supplied directly to the low impedance winding 12 and, after the core of transformer 10 saturates, the impedance of the low impedance winding 12 is only the resistance of the wire of the winding which is very small. Since the impedance of this winding is very low, there is negligible effect on the operation of the motor 10.

Figure 3A:
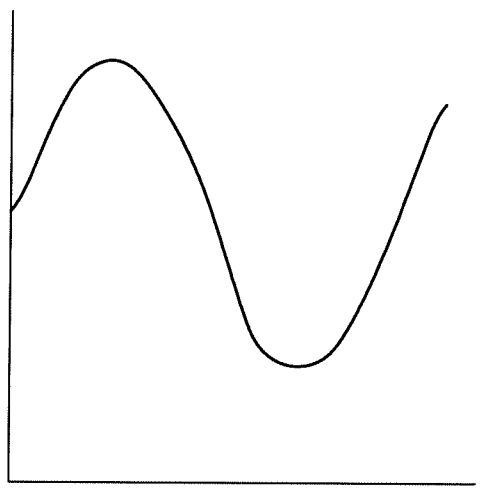
FIG. 3A is a waveform diagram illustrating the current waveform when current flows in the high impedance winding of the power harvesting circuit and the core of the transformer is unsaturated.

FIG. 3A is a waveform diagram showing the current flow in the secondary winding 13 when relay contacts K1 supply A/C current to the high impedance winding 11 of the power harvesting circuit of FIG. 1 or the relay contacts K2 supplying A/C current only to the high impedance winding 11 of the power harvesting circuit of FIG. 2. Notice that this current waveform is substantially a sinusoidal waveform having an amplitude determined by the turns ratio of primary winding 11 to secondary winding 13.

Figure 3B:
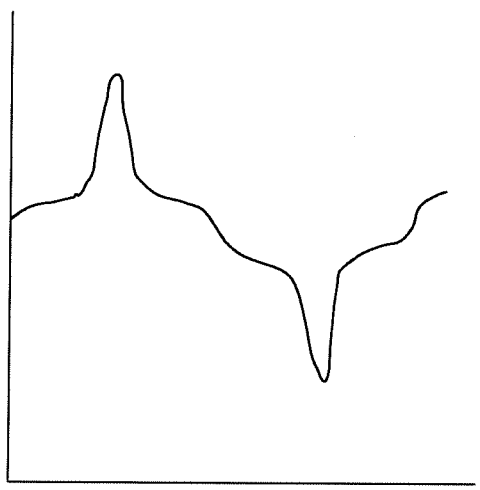
FIG. 3B is a waveform diagram illustrating the current flow in the secondary winding when current flows in the low impedance winding of the power harvesting circuit and the core of the transformer is saturated.

FIG. 3B is a waveform diagram showing the current flow in the secondary winding 13 when relay contacts K1 supply A/C current only to the low impedance winding 12 of the power harvesting circuit of FIG. 1 or when relay contacts K2 supply A/C current directly to low impedance winding 12 bypassing the high impedance winding 11 of the power harvesting circuit of FIG. 2. In both these cases, the current waveform is a series of positive and negative going pulses due to the saturation of the core of the transformer.

From the foregoing, it will be appreciated that the circuits of FIGS. 1 and 2 are able to handle varying loads since these circuits have minimal effect on the A/C current delivered to the load since the impedance of the saturable core transformer at saturation is essentially the resistance of the wire. Also, because the saturation characteristics of the transformer, the increase in the current transfer to the secondary with increasing current in the primary is minimized. This is a significant advantage as a larger number of installations can be handled by the same device and also because, due to maintenance and other factors, the load can change during the life of the product. The ability to work with variable loads is important if not critical when retrofitting existing systems with new electronic thermostats as the size of the motor (load) can vary and is not always known in advance and also due to the fact that motors have a finite live and are routinely changed, sometimes with a motor that presents a different load to the system.

Figure 2A:
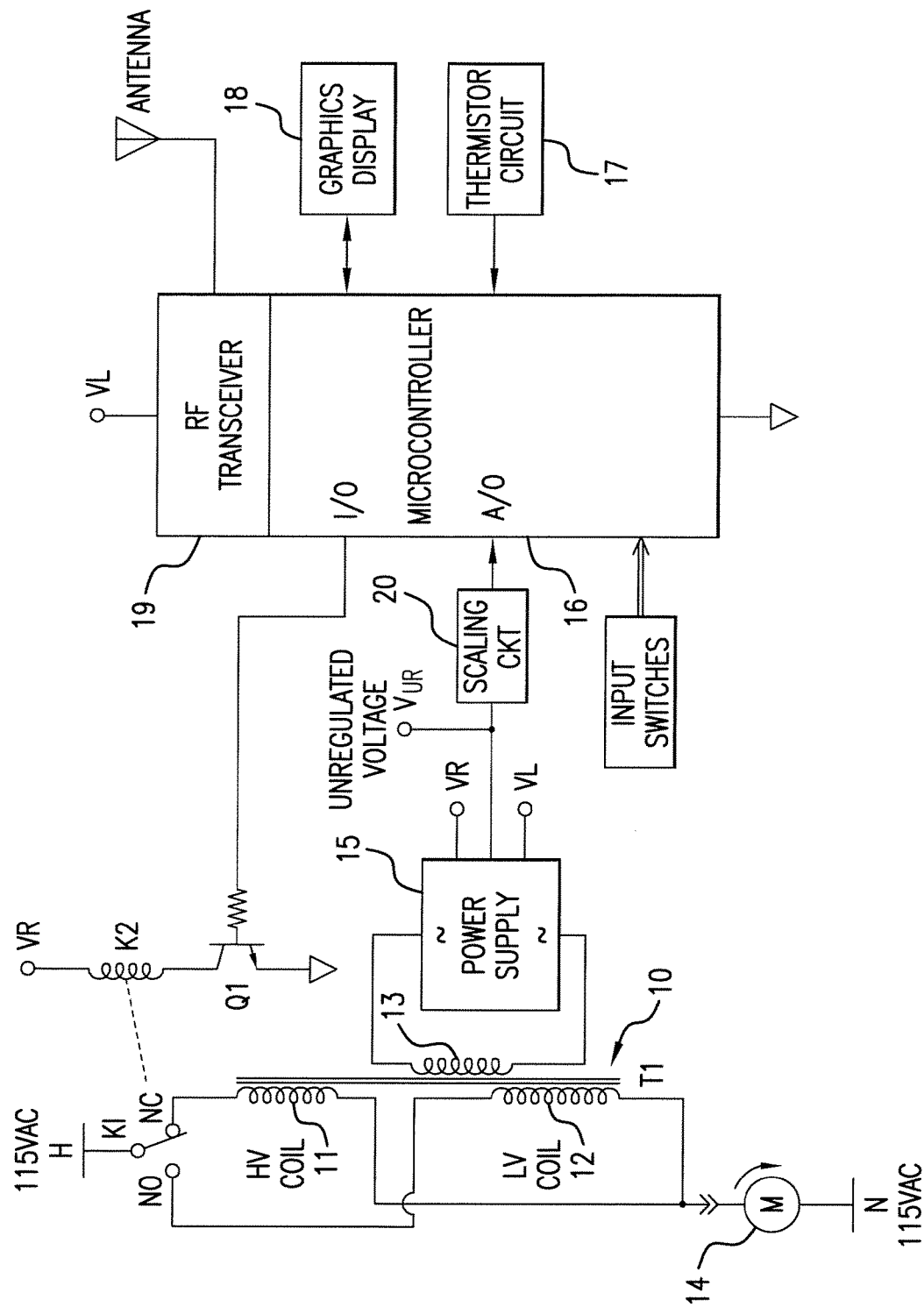
FIG. 2A is a schematic diagram of an improvement to the first and second embodiments of the power harvesting circuit according to the intention.

FIG. 2A illustrates a modification of the FIG. 2 circuit. The modification consists of the addition of a scaling circuit 20 that feeds an A/D converter in the microcontroller 16. The voltage fed to the microcontroller A/D is the scaled down unregulated power supply voltage $V_{UR}$. This voltage is roughly proportional to the current flowing through the primary of the transformer 10. Thus the microcontroller has an approximate analog to the current flowing in the primary of the transformer and this information is used to protect the circuit from a motor short and thus would make it possible to eliminate the fuse (not shown) currently used. This eliminates a problem in that momentary shorts in the motor blow the fuse and cause an equipment failure. Momentary motor shorts can occur when the load driven by the motor, which is usually a fan, gets momentarily mechanically stuck due to normal wear and tear or due to some momentary mechanical irregularity. With the microcontroller having a reference to the approximate current flow, an upper limit can be set at which the microcontroller will actuate the relay and remove the motor load. If this happens a few times, then the microcontroller can provide this information to management so that corrective action can be taken. And more importantly, a thermostat failure (due to a blown fuse) and subsequent costly service call has been prevented. This might not appear that critical but those familiar with the commercial realities of this application will consider this feature indeed a necessity.

Figure 4:
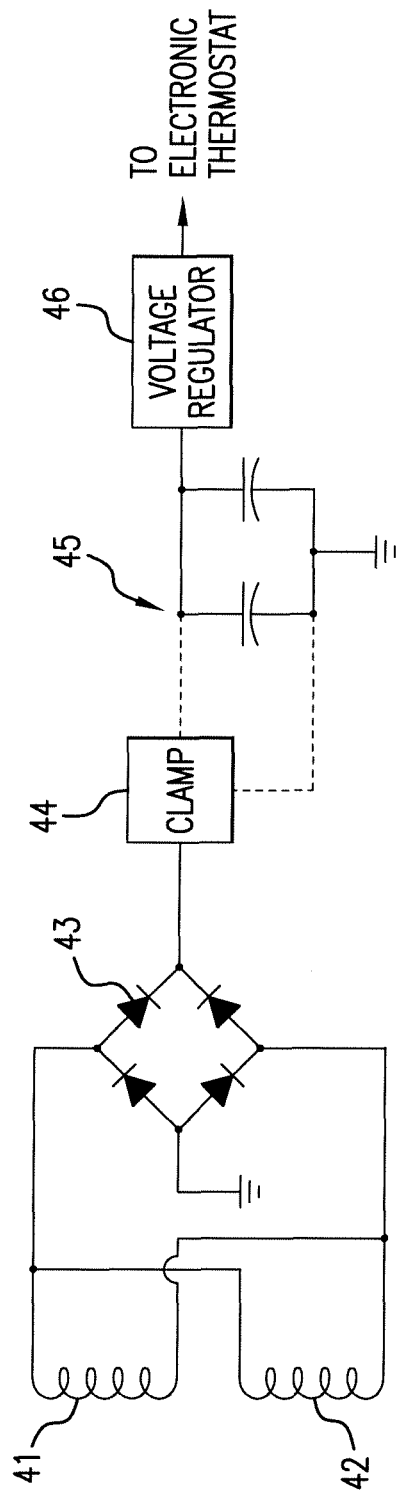
FIG. 4 is a simplified circuit diagram of the power supply for the electronic thermostat.

FIG. 4 is a simplified circuit diagram of the power supply which is capable of rectifying, filtering and regulating the output of the secondary winding of either the first or the second embodiments of the power harvesting circuit according to the invention. Specifically, the secondary winding 13 of the power transformer 10 is split into two secondary windings 41 and 42 which are connected to a rectifier bridge 43. This rectifier bridge 43 is connected to a clamp circuit 44 and then to a low pass filter 45 composed, for example, of a series of parallel capacitors. The output of the low pass filter 45 is connected to a regulator 46, which may be, for example, a step-down switching regulator. The purpose of the clamp 44 is to limit surges or voltage spikes that might damage the regulator 46. These voltage surges might be caused by a malfunctioning motor drawing excessive current. The output of the regulator 46 is supplied to the electronic thermostat.

For power dissipation reasons, the power supply load for this thermostat application has to be a switching type power supply, as a pass type regulator would dissipate too much power and, as explained before, power dissipation in this application is a big concern. As the unregulated voltage from the transformer increases due to higher primary current when the low impedance winding is used, this switching power supply load acts as a negative resistance. This plus the fact that even in saturation the transformer output voltage will increase somewhat with increasing current limits the practical limit of the current range. Another factor that limits the upper limit of the current range is that since size is critical in this application the gauge of wire that one can use for the primary coil is limited as thicker wire occupies too much space. Thus with the maximum size of coil wire that can be used because of size limitations, power dissipation at upper end of the current range becomes an issue.

Figure 5:
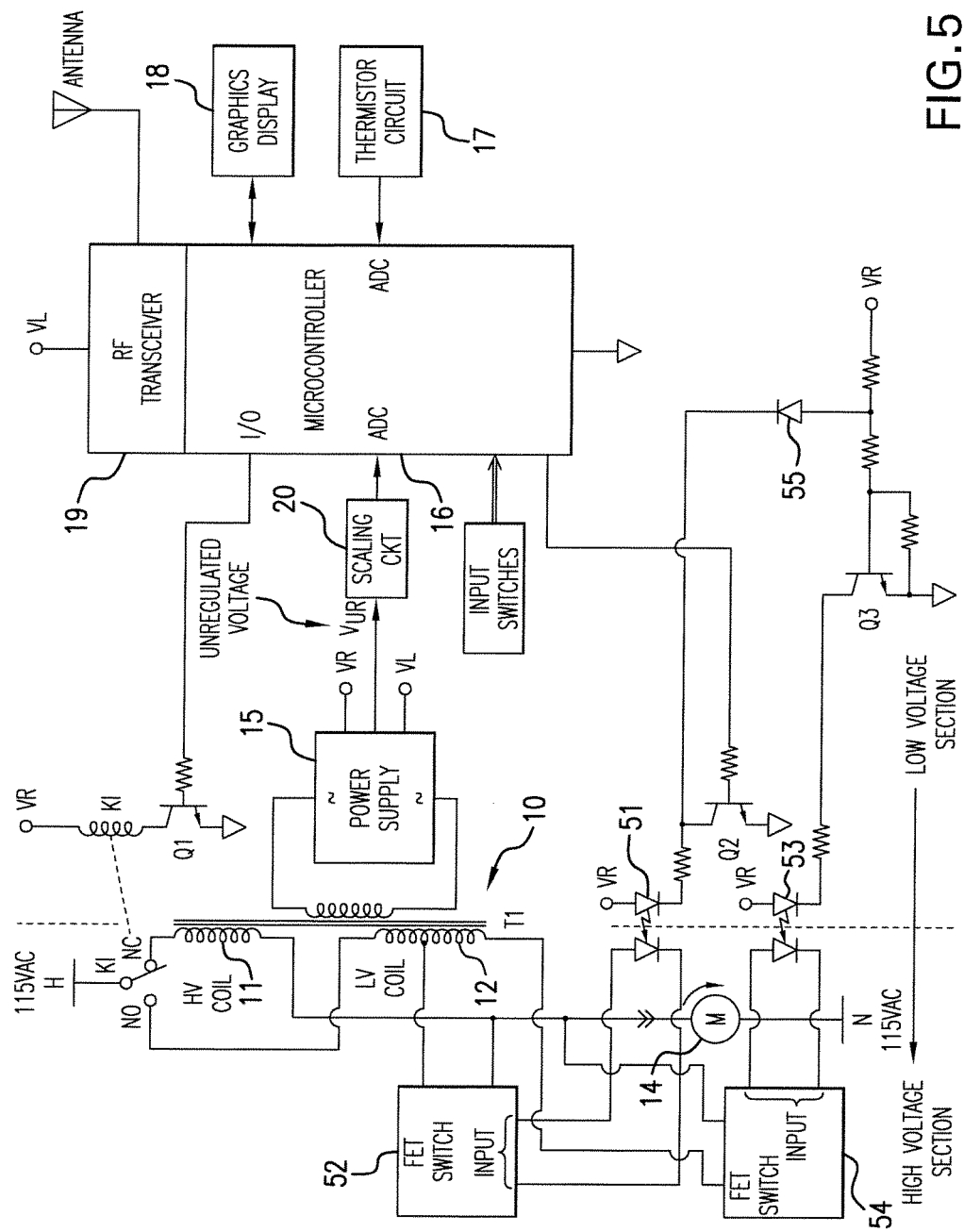
FIG. 5 is a schematic diagram of a third embodiment of the power harvesting circuit according to the invention.

FIG. 5 shows a further modification of the basic circuit which expands the practical primary current range. In this implementation the power supply unregulated voltage Vur is monitored by the microcontroller. The microcontroller 16 is programmed so that if the voltage reaches a certain high threshold, say 25 VDC, the microcontroller will turn "on" transistor Q2 which is coupled through pbotocoupler 51 to turn on FET switch 52 which in turn shorts out a certain amount, say ½ of the input coil of the second primary winding 12. Transistor Q3 is coupled through photocoupler 53 to FET switch 54. The base of transistor Q3 is connected to the collector of transistor Q2 via diode 55 so that when transistor Q2 conducts in the "on" condition, transistor Q3 is held in the "off" condition. As a result, FET switch 54 is in the opposite state than the FET switch 52; that is, when one of the FET switches 52 or 54 is "on", the other one is "off". So when FET switch 52 shorts the coil 10 at the tap, the FET switch 54 opens the other side of the coil, and vice versa. This causes the power supply 15 unregulated voltage to decrease by the proportion of coils shorted, in this example roughly by ½ or down to about 12.5V. Thus, by the use of this technique the amount of primary current that can be handled has essentially been doubled. Note that there could be more primary coil taps and more FET switches driven by the microcontroller, so this technique can be repeated and thus the primary current can be increased further as desired.

Figure 6:
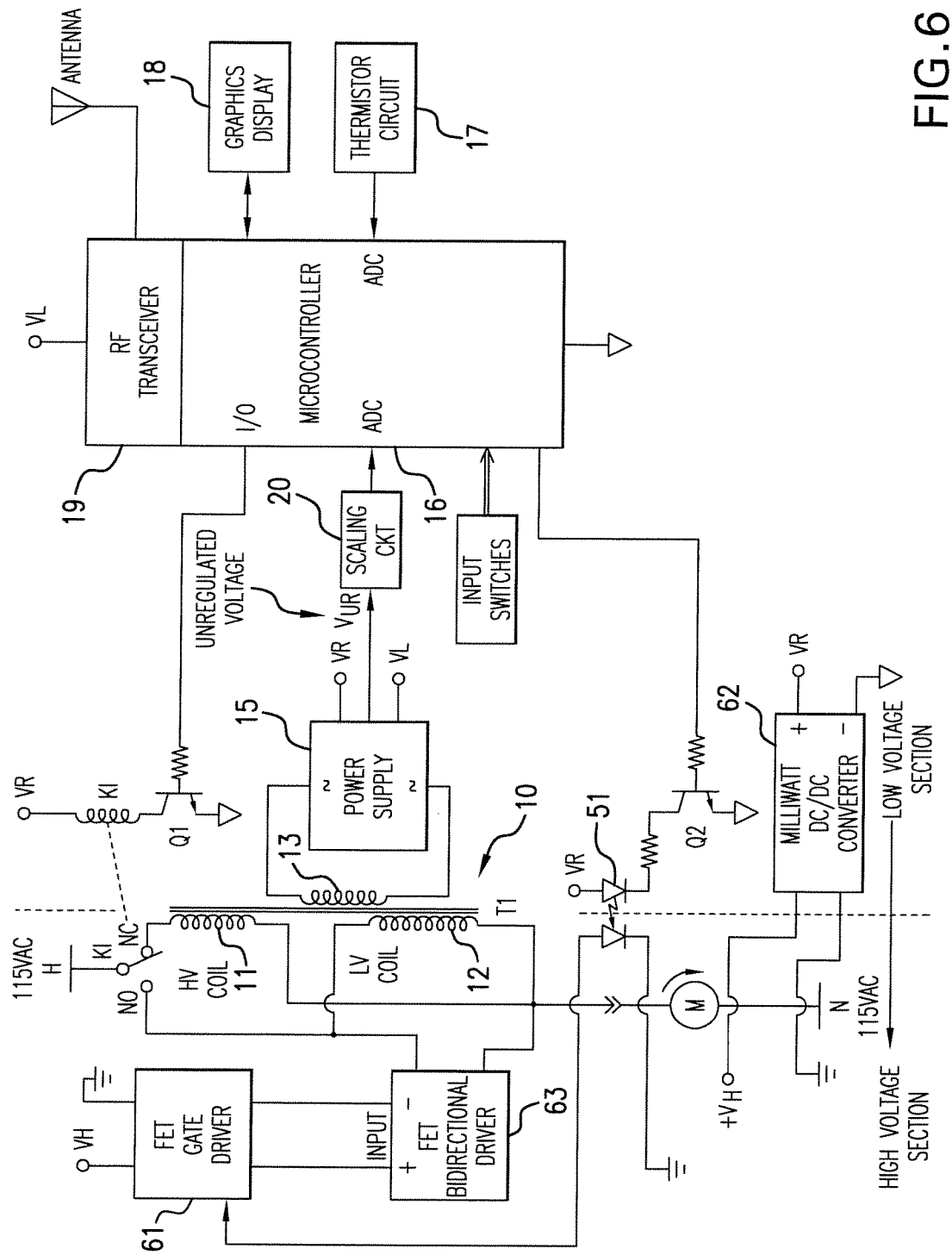
FIG. 6 is a schematic diagram of a fourth embodiment of the power harvesting circuit according to the invention.

FIG. 6 illustrates a further modification of the basic circuit which operates fundamentally essentially the same as the circuit in FIG. 5. The only difference is that the FET switch function is accomplished differently and the FET switch is shown shorting the whole second primary winding rather than a portion of the winding. More particularly, the output of the photocoupler 51 is input to an FET gate driver 61 which is powered by a milliwatt DC/DC converter 62. The FET gate driver controls the FET switch 63 which, when turned on, shorts the entire second primary winding of the transformer. The main advantage of performing the FET switch function this way is that in this implementation the switching can be accomplished faster than the circuit of FIG. 5. Faster switching allows the shorting of the whole coil, thus the microcontroller will regulate the power supply unregulated voltage by switching the FET Switch "on" when a certain maximum threshold is reached (say 25V) and will turn it "off" when the power supply unregulated voltage reaches a certain minimum threshold, say 12.5V. The advantage of this approach is that no transformer taps are needed and that it is able to accomplish a wide input current range, this range depending only on how fast the Microcontroller can regulate the power supply unregulated voltage. Also, increasing the power supply capacitance will permit slower microcontroller operation of this regulating scheme. There are many trade-offs here as those skilled in the art will appreciate. As an example, a dedicated microcontroller could be used for this function only, thus reducing any time delays and allowing faster operation.

In the embodiment shown in FIG. 6, the transformer 10 does not necessarily have to be a saturable core transformer. If both the microcontroller 16 and the solid state switches are fast enough, the circuit can operate fast enough to synch with the AC line and either cut whole cycles "on" and "off" or cutting a portion of each positive or negative cycles "off" as needed.

The embodiments of the invention described thus far employ one transformer with two primary windings and one secondary winding. The two primary windings are made up of one high impedance high voltage (i.e., 115 VAC) winding and the other one the very low impedance, very low voltage winding that is in series with the load. This is the preferred embodiment. However, one could split these two functions into two separate modules. One will be a transformer with the low voltage, low impedance winding only. This will provide power when the load is "on" and this winding is in series with the load. Then to provide power when the load is "off" one could use a separate transformer and separate module dedicated to this task. This could be a very high frequency transformer and power supply, similar to the "cubes" that one can buy to power smart phones. It will work from the 115 VAC but, as it is done with the smart phone chargers, the 115 VAC is chopped a very high frequency. This makes the transformer and the whole module small.

The circuit of FIG. 6 shows the microcontroller 16 and an A/D converter that is part of the microcontroller controlling the power Supply in order the keep the unregulated voltage within certain limits, for instance 12 VDC and 24 VDC. The circuit of FIG. 7 performs the same function using discrete electronic components. This circuit could be used as back up for the microcontroller 16 in which case the discrete component circuit will have wider voltage limits that the Micro. This would provide a safety measure in case that the microcontroller becomes disabled for any reason, including a software bug. Or the microcontroller could be used as the backup letting the circuit perform the regulation function. And in cases where there is no Micro, the circuit alone could perform the unregulated voltage control function. Note that transistor Q1 in FIG. 7 is the same transistor Q2 as in FIG. 6.

Under normal operation transistors Q2 and Q3 are either both "on" or both "off". Assuming that unregulated voltage Vur is below the high limit, approximately 26 VCD and that both transistors are "off", this state will remain until Vur increases to approximately 26 VDC. At this point and for any voltages higher than this threshold diode CR1 starts conducting and as the voltage increases the current flowing through diode CR1 is enough to turn "on" transistor Q2. When transistor Q2 is turned "on", this in turn causes current to flow through resistor R4 which turns "on" transistor Q3. And when transistor Q3 turns "on" it supplies current to the base of transistor Q2 via diode CR2 and resistor R5, thus keeping transistor Q2 "on" regardless of the amount of current being supplied by diode CR1. Thus transistor Q2 is latched "on" and it remains "on" until the unregulated voltage Vur decreases to the low threshold level of approximately 12 VDC. At this point there is no current flowing through diode CR1 and Vur is low enough that there is not enough current flowing through diode CR2 to keep transistor Q2 "on". Thus transistor Q2 turns "off" which turns "off" transistor Q3 until again Vur increases above the high threshold of approximately 26 VDC and the process repeats itself in this fashion. The net result is that Vur is thus kept between the low and high thresholds via transistor Q1, which performs the same function in FIG. 7 as it does in FIG. 6. Note that in FIG. 6, this transistor is labeled Q2. On input to transistor Q1, Vm is provided so that either the microcontroller or the circuit can drive transistor Q1. Thus, either the circuit or the microcontroller can perform the primary regulation function with the other one being the backup.

Figure 7:
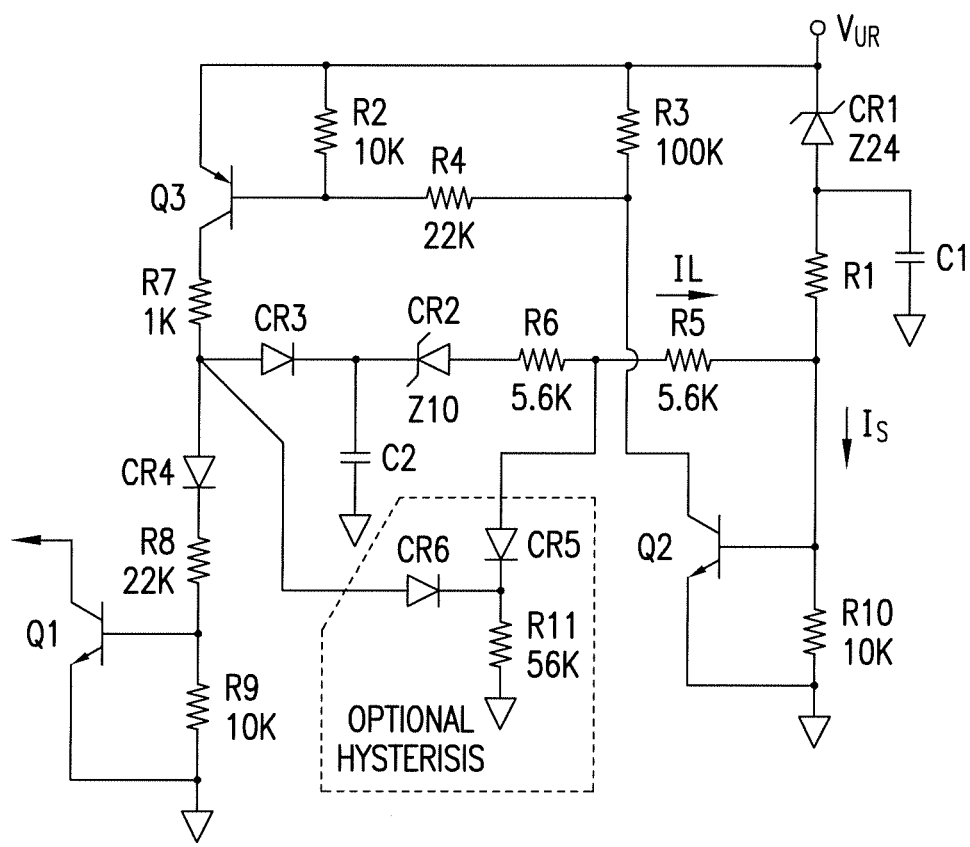
FIG. 7 is an alternative circuit diagram of a circuit for keeping the unregulated voltage within predetermined limits.

While FIG. 7 shows a specific discrete component circuit implementation to accomplish the desired result, those skilled in the art will appreciate that there are many variations of the same circuit concept possible using other components like FETs or SCRs or Integrated Circuits.

Figure 8:
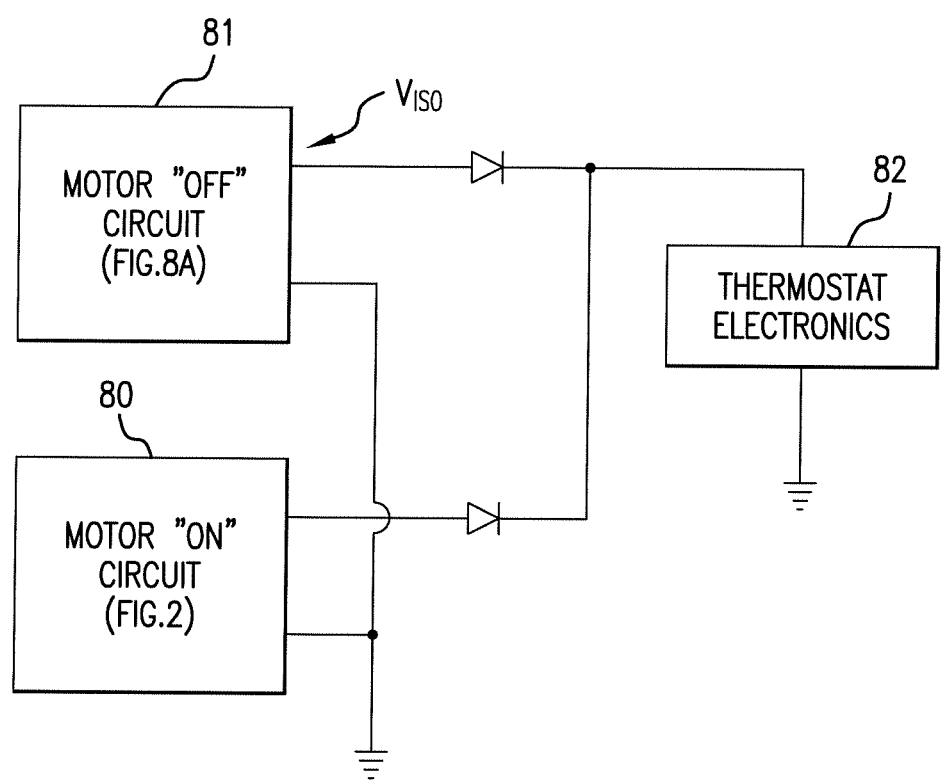
FIG. 8 is a block diagram of a fifth embodiment which is a direct power harvesting circuit according to the invention.

FIG. 8 shows a block diagram of a fifth embodiment of the power harvesting circuit, this method being a direct power harvesting method. By direct power harvesting, what is meant is a method of obtaining power from the motor circuit that does not use a transformer. The power is taken directly from the same wire that feeds the load. There are two circuits in FIG. 8. One is the motor "on" circuit 80, and to other is the motor "off" circuit. The motor "on" circuit, in a preferred embodiment, is the FIG. 2 embodiment but with a transformer T1 having only a single primary winding, specifically, the high voltage winding 11. The low voltage winding 12 is not used in this exemplary embodiment. The voltage output is taken from the voltage "on" circuit 80 or the voltage "off" circuit 81, whichever one is "on" to power the thermostat electronics 82, as shown in FIG. 8.

Figure 8A:
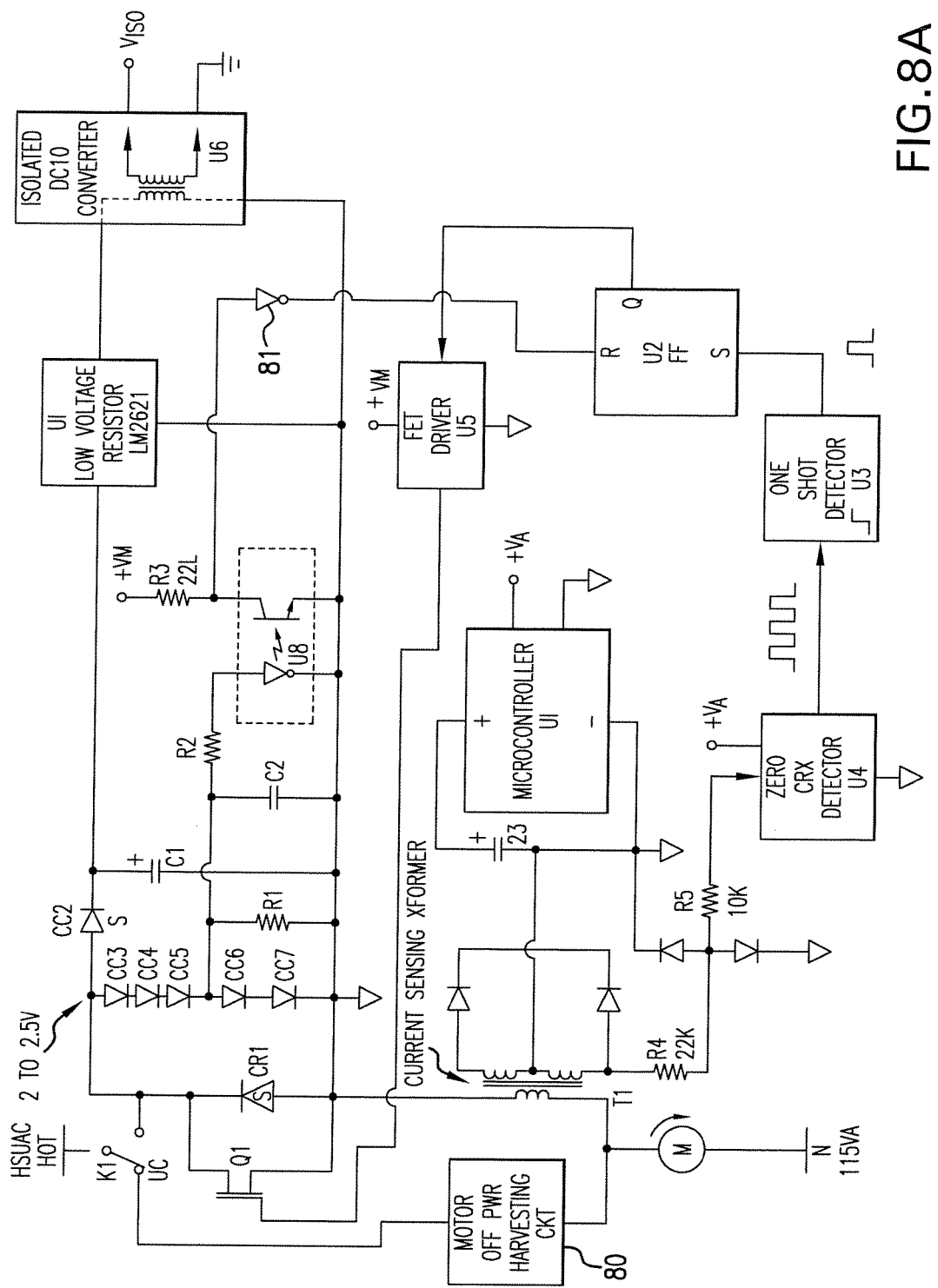
FIG. 8A is a schematic diagram of the fifth embodiment of the invention.

The circuit illustrated in FIG. 8A obtains power when the load (i.e., motor) is energized, which is the main challenge in obtaining power from the current flow in a wire. Obtaining power when the load (i.e., motor) is de-energized is relatively simple in comparison and can be accomplished via a transformer or an 115 VAC AC/DC converter as is done is telephone chargers. Thus, FIG. 8A shows the "power on" harvesting circuit 80 in block diagram form with the idea that there are many good, existing alternatives that can be used for this function. One example is illustrated by the circuitry in FIG. 2 but only the one primary winding 11 of transformer T1. The "power off" circuit 81 in FIG. 8 is shown in more detail in FIG. 8A.

The circuit of FIG. 8A obtains power from the motor wire at the beginning of every cycle and in the circuit shown obtains power only on the positive part of the cycle. But note that another identical circuit could be added to also obtain power from the negative cycle. Operation is as follows: as the cycle goes from negative to positive and crosses zero, the current sensing transformer T1 and zero crossing detector U4 detects this event, and the one shot U3 generates a pulse that sets the flip-flop U2 which acts as the memory means. When the flip-flop U2 is set, the output Q of the flip-flop commands the FET driver U5 to open the shorting FET Q1. With Q1 open, the motor current starts flowing through diode CR2 and charges capacitor C1 to a level that is clamped by the series diodes CR3 through CR7. The capacitor voltage when fully charged will be around 2V and the voltage across the diodes around 2.5V. When the capacitor reaches about 2V the diode string clamping voltage of about 2.5V is reached and current starts flowing through the diode string (i.e., CR3 through CR7). This produces a voltage across diodes CR6 and CR7. and this voltage is sensed by optoisolator U8. Optoisolator U8 turns "on" and this signal through the inverter 81 produces a reset signal to the flip-flop U2. The flip-flop resets and then the output Q of the flip-flop U2 commands the FET driver U5 to turn "on" FET Q1 which shorts the diode string and Schotky diode CR1. Thus, all of the motor current now flows through Q1 and that state is maintained until the cycle is repeated again at the beginning of the positive cycle. Diode CR1 is necessary only for startup conditions.

This approach increases the range of motor currents from which power can be obtained. Power is obtained at the beginning of each cycle, low motor currents use more of the cycle while high motor current would use a proportionally less percentage of the cycle. This approach also minimizes power dissipation of the harvesting circuit. During normal operation the only component that will dissipate significant power is the shorting FET Q1. Modern low voltage FETs have very low resistance, thus Q1 will provide a very good short circuit with relatively low power dissipation, especially when compared with a transformer based design.

While the circuit of FIG. 8A has been shown in a particular embodiment, those familiar with the state of the art will recognize that there are many other implementations possible. For instance, while an optoisolator U8 is used to detect current flow through the diode string, there are many other ways of accomplishing this task, including actually measuring this current with a current sensor or using a device more precise than the optoisolator U8, like an operational amplifier comparator, for instance.

Also, there are many ways of obtaining the zero crossing signal, including eliminating the current sensing transformer and sensing zero crossing directly via a very low resistance and operational amplifier combination. The circuit shown obtains power only during the positive transition of the cycle. Adding an identical circuit with opposite polarity will obtain power also from the negative cycle.

In the embodiment shown, initially when relay K1 switches to the "motor on" position, there is no power on the circuit. Thus, until capacitor C1 is charged and the power supply starts the motor current will flow through the diode string if the cycle is positive or via diode CR1 if the cycle is negative. This condition will persist for perhaps one or two cycles after which capacitor C1 will be charged and the circuit will have normal power.

Another embodiment would power the zero crossing circuit also from the "motor off" module 80. In this case other startup strategies could be implemented. For instance, one could keep FET Q1 shorted for a few milliseconds until the startup surge subsides.

Figure 9:
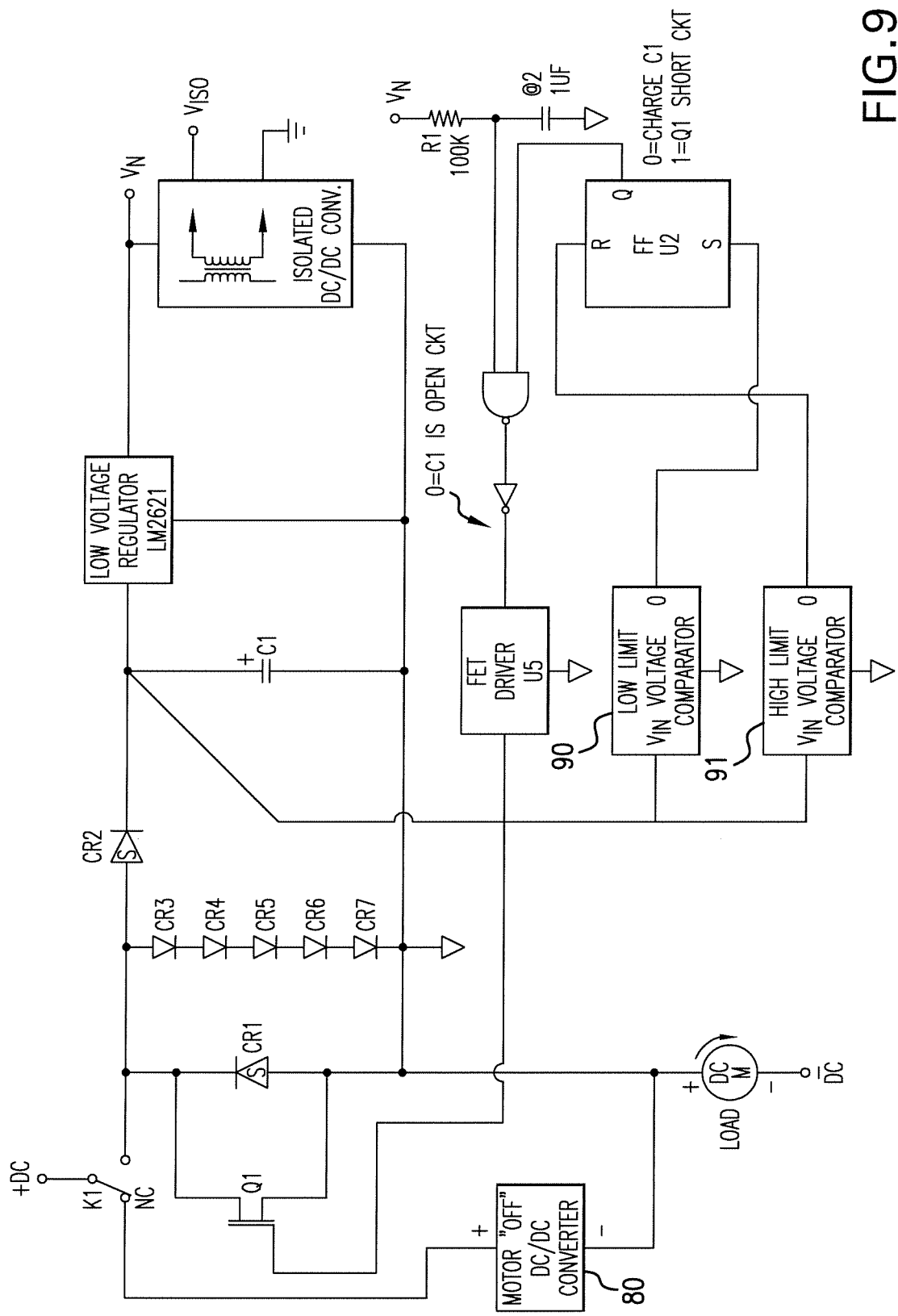
FIG. 9 is a modification of the fifth embodiment which can be used for both DC and AC applications.

The foregoing description describes a general method to obtain power from an A/C current carrying wire. This method cam be extended to also cover a DC current carrying wire. As illustrated in FIG. 9, what changes is the method employed to reset the memory device (i.e., flip-flop U2). With a DC current carrying wire, instead of having means to detect when the A/C current crosses and having a zero crossing detector, other means to set and reset the memory device. The preferred means is to add low limit voltage comparator 90 and high limit voltage comparator 91 which monitor the voltage across capacitor C1. Low limit voltage comparator 90 provides an output that sets flip flop U2, and high limit voltage comparator 91 provides an output that resets flip-flop U2. The low limit voltage comparator 90 provides a means to detect when the voltage across the energy storing capacitor C1 has decreased to a specified level. In the preferred embodiment, this threshold could be when the capacitor voltage has decreased by approximately 0.5V from the fully charged level. This event will then generate the signal that will set the memory device, in the preferred embodiment flip-flop U2. This event will then start the capacitor charging cycle. The end result is that the energy storing capacitor is recharged when its voltage decreases by a specified amount of voltage. Thus in the preferred embodiment the energy storing capacitor C1 voltage will be held between approximately 2.5V and 2V.

The method described with reference to FIG. 9 can be applied to an A/C current carrying wire as well. The main disadvantage of applying this method to an A/C current carrying wire is that then the charging will not be synchronized with the A/C frequency and could happen at any time in the A/C cycle. While this is a disadvantage, there might be applications where the simplicity of this method will make it the preferred approach versus the method described with respect to the circuit of FIG. 8A.

In the manner described above, power can be harvested from either the positive going cycle of the negative going cycle of both. And since the power being harvested is very small compared to the total power delivered by the wire, the operation of this power harvesting circuit will have a negligible impact on the load.

While the invention has been described in terms of preferred embodiments, those skilled in the art will recognize that the invention can be practiced with modification within the spirit and scope of the appended claims.

The invention claimed is:

1. A power harvesting system comprising:
  a transformer having first and second primary windings and a secondary winding, the first primary winding being a high impedance winding with a large number of turns and the second primary winding being a low impedance winding with a small number of turns, the first and second primary windings connected with a load, the second primary winding of the transformer having one or more taps;
  a relay having first and second contacts, the first contact being connected to the first primary winding and the second contact being connected to the second primary winding, the relay being operable in a first state to connect A/C power to the first primary winding and in a second state to connect A/C power the second primary winding,
  whereby when A/C power is connected to the first primary winding, a small current flows in the first primary winding which is insufficient to activate the load but sufficient to transfer sufficient power to the secondary winding, and when A/C power is connected to the second primary winding, a larger current flows in the second primary winding sufficient to activate the load and to transfer sufficient power to the secondary winding;
  a first switch controlled to selectively short said one or more taps of the second primary winding;
  a second switch connected from the second primary winding and the load;
  a power supply connected to the secondary winding of the transformer, the power supply providing at least an unregulated output voltage;
  a sensor that senses the unregulated output voltage as an approximate function of current flowing in a primary winding of the transformer to the load, said sensor further controlling said first switch to short said one or more taps of the second primary winding and for controlling the second switch open a connection between the second primary winding and the load when said first switch shorts said one or more taps of the second primary winding.

2. The power harvesting circuit recited in claim 1, further comprising an electronic thermostat powered by said power supply.

3. A method to harvest power from an A/C current carrying wire comprising the steps of:
  in series with the current carrying wire, diverting the flow of current to an energy storage capacitor on a positive cycle, a negative cycle or both the positive and negative cycles of the A/C current;
  clamping with a clamping circuit the voltage across the energy storage capacitor to a predetermined level;
  measuring a voltage or current flowing through the clamping circuit;
  when the current flowing through the clamping circuit reaches a predetermined level or when the voltage across the clamping circuit or the energy storage capacitor reaches a predetermined level, sending a signal to activate or reset a memory device;
  sending and maintaining a signal from the memory device when reset to a shorting device to put a short circuit in the clamping circuit and direct the flow of current to a load and away from the clamping circuit and the energy storage capacitor;
  maintaining the signal from the memory device until the memory device is set at a beginning of a cycle the A/C current; and
  setting the memory device by a zero crossing sensing circuit and removing the signal from the shoring device to allow current flow to be diverted to the energy storage capacitor.

4. A power harvesting circuit connected to an A/C current carrying wire, the power harvesting circuit comprising:
  a diverting circuit In series with the current carrying wire to divert the flow of current to an energy storage capacitor;
  a clamping circuit connected across the energy storage capacitor to clamp the voltage to a predetermined level;
  a measuring circuit connected across the diverting circuit or across the energy storage capacitor to measure the voltage or to measure the current flowing through the clamping circuit;
  a shorting device to short the diverting circuit;
  a memory device which is activated or reset by signal generated as soon as the current flowing through the clamping circuit reaches a predetermined level or when the voltage across the clamping circuit or the energy storage capacitor reaches a predetermined level, resetting the memory device sends and maintains a signal to the shorting device, shorting the clamping circuit and directing the flow of current to a load and away from the clamping circuit and the energy storage capacitor;
  a zero crossing sensing circuit connected to detect when the A/C current in the current carrying wire becomes zero as it swings between positive and negative or negative and positive on each cycle of the A/C current, the zero crossing sensing circuit setting the memory device upon sensing a zero crossing the A/C current;
  whereby setting of the memory device removes the signal from the shorting device and allows then the current flow to be diverted to the energy storage capacitor, and thereby a new cycle of harvesting power begins.

5. The power harvesting circuit as recited in claim 4, wherein the shorting device is an FET.

6. The power harvesting circuit as recited in claim 5, wherein the memory device is a flip-flop which, when set, generates an output signal which causes the FET to conduct and short the clamping circuit and the energy storage capacitor.

7. The power harvesting circuit as recited in claim 4, wherein the zero crossing sensing circuit comprises:
- a current sensing transformer having a primary winding connected in series between the A/C current carrying wire and the load and a secondary winding;
- a zero crossing detector connected to the secondary winding of the current sensing transformer; and
- a pulse generating device responsive to an output of the zero crossing detector to generate a pulse to set the memory device.

8. The power harvesting circuit recited in claim 4, wherein the load is an electric motor.

9. A power harvesting circuit connected to a current carrying wire, the power harvesting circuit comprising:
- a diverting circuit in series with the current carrying wire to divert the flow of current to an energy storage capacitor;
- a clamping circuit connected in such a way as to clamp the voltage across the energy storage capacitor;
- a measuring circuit connected across the energy storage capacitor to measure the voltage across the energy storage capacitor;
- a shorting device to short the diverting circuit;
- a memory device which is activated or reset by signal generated as soon as voltage across the energy storage capacitor reaches a predetermined level, resetting the memory device sends and maintains a signal to the shorting device, shorting the clamping circuit and directing the flow of current to a load and away from the clamping circuit and the energy storage capacitor;
- the memory device being set by a signal generated when a voltage across the energy storage capacitor decreases to a predetermined level;
- whereby setting of the memory device removes the signal from the shorting device and allows then the current flow to be diverted to the energy storage capacitor, and thereby a new cycle of harvesting power begins.

10. The power harvesting circuit recited in claim 9, further comprising:
- a high limit voltage comparator which generates the signal to reset the memory device; and
- a low limit voltage comparator which generates the signal to set the memory device.

* * * * *